United States Patent
Tangeland et al.

(10) Patent No.: US 11,032,482 B2
(45) Date of Patent: Jun. 8, 2021

(54) AUTOMATIC SCREEN BRIGHTNESS AND CAMERA EXPOSURE ADJUSTMENT FOR REMOTE MULTIMEDIA COLLABORATION SESSIONS

(71) Applicant: Cisco Technology, Inc., San Jose, CA (US)

(72) Inventors: Kristian Tangeland, Oslo (NO); Frode Tjøntveit, Fjellhamar (NO); Erik Hellerud, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/531,977

(22) Filed: Aug. 5, 2019

(65) Prior Publication Data
US 2021/0044734 A1 Feb. 11, 2021

(51) Int. Cl.
*H04N 5/235* (2006.01)
*H04N 5/232* (2006.01)
*H04N 7/15* (2006.01)
*H04N 7/14* (2006.01)
*H05B 45/10* (2020.01)
*H05B 47/155* (2020.01)
*H05B 47/175* (2020.01)

(52) U.S. Cl.
CPC ....... *H04N 5/2351* (2013.01); *H04N 5/23219* (2013.01); *H04N 7/142* (2013.01); *H04N 7/147* (2013.01); *H04N 7/15* (2013.01); *H05B 45/10* (2020.01); *H05B 47/155* (2020.01); *H05B 47/175* (2020.01)

(58) Field of Classification Search
CPC .. H04N 5/2351; H04N 5/23219; H04N 7/147; H04N 7/15; H04N 7/142; H05B 45/10; H05B 47/155; H05B 47/175
See application file for complete search history.

(56) References Cited

U.S. PATENT DOCUMENTS

| | | | |
|---|---|---|---|
| 8,130,257 B2 | 3/2012 | Cutler | |
| 8,165,416 B2 | 4/2012 | Cutler | |
| 8,731,299 B2 | 5/2014 | Hawkins et al. | |
| 8,982,177 B2 | 3/2015 | Modai et al. | |
| 10,110,851 B2 | 10/2018 | Alrod et al. | |
| 2004/0061838 A1* | 4/2004 | Mochizuki | H04N 9/3194 353/69 |
| 2008/0218501 A1* | 9/2008 | Diamond | G09G 3/22 345/207 |
| 2013/0113975 A1* | 5/2013 | Gabris | H04N 9/3194 348/333.1 |

(Continued)

*Primary Examiner* — Timothy J Henn
(74) *Attorney, Agent, or Firm* — Polsinelli PC (57) ABSTRACT

The present disclosure provides methods and systems related to automatic adjustment of screen brightness for optimized presentation to both physically present and remote audience during the multimedia collaboration session. In one aspect, a method includes detecting presence of a screen in the field of view of a camera in a meeting room; determining if exposure of the camera or brightness of the screen is to be adjusted, to yield a determination; and controlling at least one of the exposure of the camera or the brightness of the screen based on the determination such that viewing of meeting room and the screen are legible for one or more audience and the screen is legible for one or more audience present in the meeting room.

20 Claims, 6 Drawing Sheets

(56) References Cited

U.S. PATENT DOCUMENTS

| | | | | |
|---|---|---|---|---|
| 2014/0111492 A1* | 4/2014 | Liang | .................. | G09G 5/10 |
| | | | | 345/207 |
| 2014/0333585 A1* | 11/2014 | Suzuki | ................ | H04N 9/3194 |
| | | | | 345/175 |
| 2015/0346825 A1* | 12/2015 | Chiu | .................. | G06F 3/0317 |
| | | | | 345/158 |
| 2017/0324933 A1* | 11/2017 | Alrod | .................. | H04N 7/142 |
| 2018/0278899 A1* | 9/2018 | Hailpern | ................ | G06F 3/017 |

\* cited by examiner

FIG. 5

AUTOMATIC SCREEN BRIGHTNESS AND CAMERA EXPOSURE ADJUSTMENT FOR REMOTE MULTIMEDIA COLLABORATION SESSIONS

TECHNICAL FIELD

The present technology pertains to managing remote multimedia collaboration sessions and more specifically to automatic adjustment of screen brightness and camera exposure for optimized presentation to both physically present and remote audience during the multimedia collaboration session.

BACKGROUND

In today's interconnected world, video conferencing presents a very suitable option for many users located in different geographical locations to communicate and collaborate. Step by step, advancements in technologies related to video conferencing enable users to have an experience that resembles in person meetings where all users are physically present in a single location, can listen to other participants, present material and collaborate.

Use of digital screens and boards such as smart whiteboards during such collaboration/video conferencing sessions is typical. As such digital screens are typically in the field of view of camera(s) that are broadcasting the sessions to remote audience and the digital screens can appear very bright. Adjusting the brightness of the digital screens for audience who are physically present in the room may result in overexposure (bright and unreadable) of the digital screens for the remote audience through the broadcasting cameras while proper brightness of the digital screens for the remote audience results in underexposure (dark and unreadable) of the digital screens for physically present audience. Furthermore, adjusting screen brightness or camera exposure may also negatively impact, for the remote audience, depiction of the a conference room and physically present audience in the conference room.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

1. Overview

The present disclosure describes several example embodiments directed to optimizing brightness of screens/exposures of cameras that are used to convey information in a multimedia collaboration session, for both in person users present in a physical location in which the screens are installed as well as remote users who are connected to and are able to view the screens using their remotely connected multimedia devices.

In one aspect, a method includes detecting presence of a screen in the field of view of a camera in a meeting room; determining if exposure of the camera or brightness of the screen is to be adjusted, to yield a determination; and controlling at least one of the exposure of the camera or the brightness of the screen based on the determination such that viewing of meeting room and the screen are legible for one or more audience and the screen is legible for one or more audience present in the meeting room.

In another aspect, a system includes a screen; a camera configured to capture live images within a room for transmission to one or more remote end users; and a controller. The controller is configured to detect presence of the screen; determine if exposure of the camera or brightness of the screen is to be adjusted, to yield a determination; and control at least one of the exposure of the camera or the brightness of the screen based on the determination such that viewing of meeting room and the screen are legible for one or more audience and the screen is legible for one or more audience present in the meeting room.

In another aspect, a non-transitory computer-readable medium has computer-readable instructions, which when executed by at least one processor, causes the at least one processor to detect presence of a screen in a field of view of a camera in a meeting room; determine if exposure of the camera or brightness of the screen is to be adjusted, to yield a determination; and control the exposure of the at least one camera or the brightness of the screen based on the determination such that viewing of meeting room and the screen are legible for one or more audience and the screen is legible for one or more audience present in the meeting room.

2. Description

The present disclosure provides methods and systems related to automatic adjustment of screen brightness and/or camera exposure for optimized presentation to both physically present and remote audience during the multimedia collaboration session. The disclosure begins with a description of example settings in which the concepts presented herein may be implemented.

Figure 1:
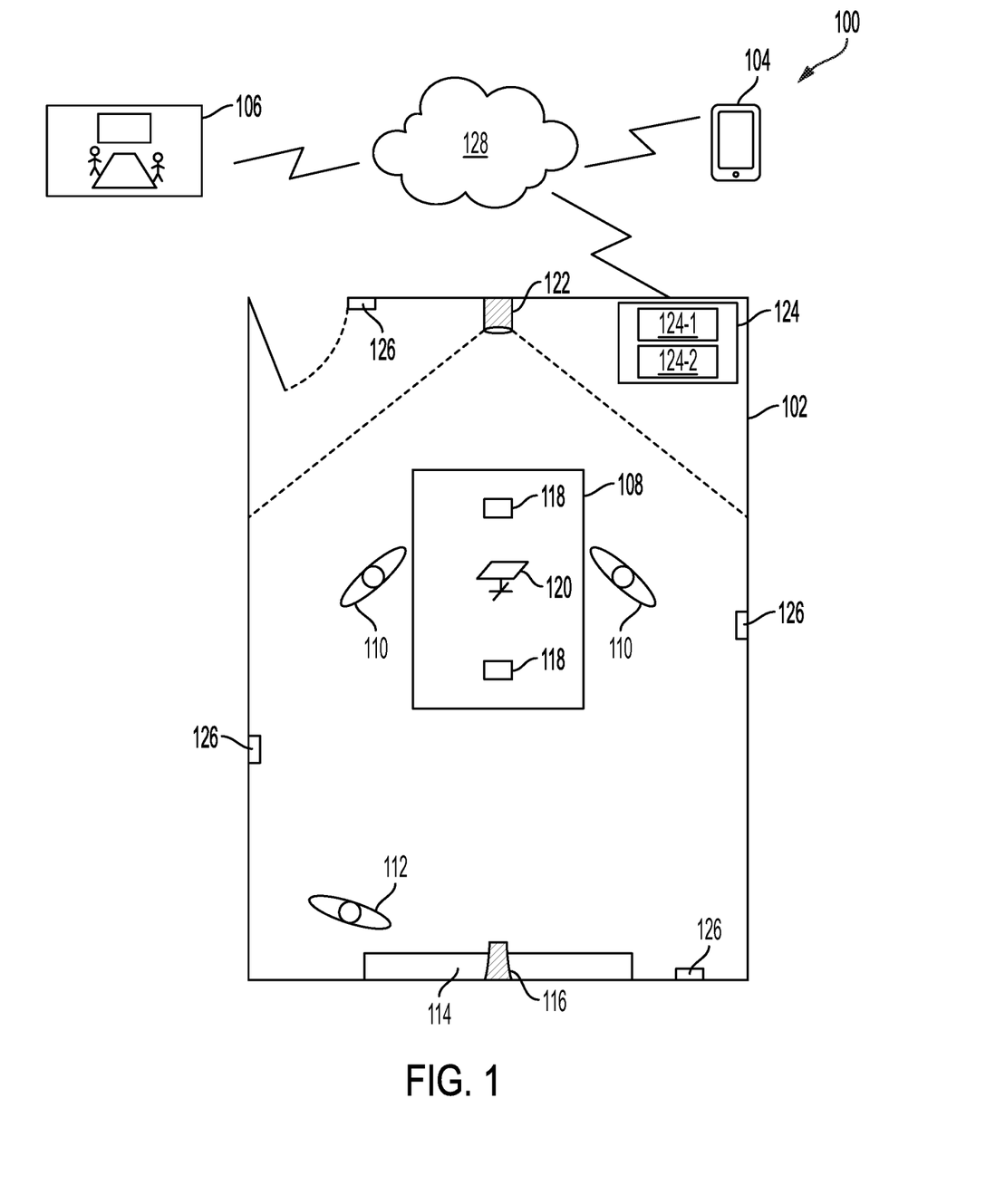
FIG. 1 illustrates a multimedia collaboration setting, according to one aspect of the present disclosure.

FIG. 1 illustrates a multimedia collaboration setting, according to one aspect of the present disclosure. In an example of a multimedia collaboration session using video conferencing, setting 100 includes three separate parties participating in the multimedia collaboration session. Setting 100 includes a conference room 102, a remote mobile device 104 and another conference room 106. While FIG. 1 illustrates an example three separate parties, the present disclosure is not limited thereto and there may be more or less parties participating in the multimedia collaboration session.

The conference rooms 102 and 106 and the mobile device 104 are remotely connected to one another through the appropriate local area connections and over the internet, as is known (e.g., cloud based collaboration server 128). In other words, the conference rooms 102 and 106 and the mobile device 104 are located in different geographical locations.

Conference room 102 includes a table 108, with one or more audience 110 sitting at table 108. There may also be at least one other audience, which may be referred to as presenter 112 who may have material content to present to audience 110 and/or any other remotely connected audience such as audience present in conference room 106 and/or audience associated with mobile device 104. Presence of presenter 112 is optional and the concepts disclosed herein are applicable to situations where no particular presenter is making a presentation to audience 110 and/or remote audience.

Conference room 102 may further include display 114 and main camera 116. Display 114 may be a digital display such as a digital whiteboard and/or any other display device that may be used by presenter 112 to present content/make presentations to audience 110 and/or remote audience. Display (screen) 114 may be any known or to be developed display device capable of presenting content to audience. Display 114 may have an adjustable brightness that may be controlled by processing unit (controller) 124, as will be further described below with reference to FIG. 4.

Optionally, display 114 can be configured to present a view of other remote participating parties (e.g., audience using mobile device 104 and/or audience in conference room 106). In such case, display 114 may have a display section with a plurality of thumbnail display sections, each of which may display a view of a current speaker during the multimedia collaboration session. For example, when a participant associated with mobile device 104 speaks, display 114 can display a view of the participating associated with mobile device 104 (which may also include the surrounding areas of the participant visible through a camera of mobile device 104). At the same time, each of thumbnail display sections represents a small version of a view of each different remote location and its associated participants taking part in the video conferencing session. For example, assuming that conference room 102 is a branch of company A located in New York and conference room 106 is another branch of company A located in Los Angeles and mobile device 104 is associated with an employee of company A teleworking from Seattle, then one of thumbnail display regions corresponds to a view of conference room 102 and its participants as observed by main camera 116, another one of thumbnail display regions corresponds to a view of conference room 106 and its participants as observed by cameras installed therein and another one of thumbnail display regions corresponds to a view of the teleworking employee of company A using mobile device 104. Furthermore, each thumbnail display region can have a small caption identifying a geographical location of each of conference rooms 102 and 106 and mobile device 104 (e.g., New York office, Los Angeles office, Seattle, Wash., etc.).

Main camera 116 may operate to provide a view of conference room 102 to remote audience at mobile device 104 and/or in conference room 106. In one example, main camera 116 may utilize a technology capable of tracking and focusing on presenter(s) and/or individual audience 110 who may be actively participating, commenting, speaking during the multimedia collaboration session, etc. This tracking system can be the SpeakerTrack system developed, manufactured and distributed by Cisco Technology, Inc., of San Jose, Calif. For example, if one audience 110 is currently speaking, main camera 116 can zoom in (and/or tilt horizontally, vertically, diagonally, etc.) in order to present/capture a focused stream of audience 110 to participants at mobile device 104 and/or conference room 106, a close up version of audience 110 rather than a view of the entire conference room 102 which results in audience 110 and/or other users/presenters being shown relatively smaller (which makes it more difficult for remote participants to determine accurately who the current speaker in conference room 102 is). In one example, instead of one, there may be a pair of main cameras 116 utilized for better tracking of users/speakers inside conference room 102.

In one example, conference room 102, mobile device 104 and conference room 106 may be connected to cloud based collaboration server 128. Collaboration server 128 can have one or more processors and one or more memories to implement functionalities thereof to ensure establishing and maintaining connections between conference rooms 102 and 106 and mobile device 104 during the multimedia collaboration session.

Furthermore, collaboration server 128 can be used by a participant to setup the multimedia collaboration session (e.g., create an event with a given date and duration as well as identification of participants, etc.). The created event may then be shared with identified participants or associated parties via for example, an electronic mail, a text message, an application-based notification, etc. Identified participants can then interact with the invitation to accept, reject or provide any other indication with respect to their participation status in the event.

While certain components and number of different elements are described as being included in setting 100, the present disclosure is not limited thereto. For example, there may be more or less participants participating in a video conferencing session via their corresponding devices than that shown in FIG. 1. There may be more or less participants in each conference room shown in FIG. 1. Mobile device 104 is not limited to being a mobile telephone device but can instead be any known or to be developed mobile computing device having necessary components (e.g., a microphone, a camera, a processor, a memory, a wired/wireless communication means, etc.) for communicating with other remote devices in a video conferencing session.

Furthermore, software/hardware for enabling the video conferencing session may be provided by various vendors such as Cisco Technology, Inc. of San Jose, Calif. Such software program may have to be downloaded on each device or in each conference room prior to being able to participate in an online video conferencing session. By installing such software program, participants can create, schedule, log into, record and complete one or more video conferencing sessions.

FIG. 1 describes above provides an example setting with a camera having the entire conference room 102 including its users, presenter, screen and main camera in its FOV. Furthermore, example setting of FIG. 1 is one where cameras and display are coupled to the same audio/video codec for adjusting exposure of camera 122 and/or brightness of display 114 and ultimately optimizing view of display 114 as well as conference room 102 and audience 110 for physically present as well as remote users.

Alternatively, setting 100 of FIG. 1 may be replaced with one, where not all components are connected to the same audio/video codec but instead several disparate systems (digital whiteboards, cameras, displays, etc.) may be utilized in a conference room and more broadly in a multimedia collaboration session. Examples of such settings to which the present disclosure is applicable will be described below with reference to FIGS. 2A-B.

Figure 2A:
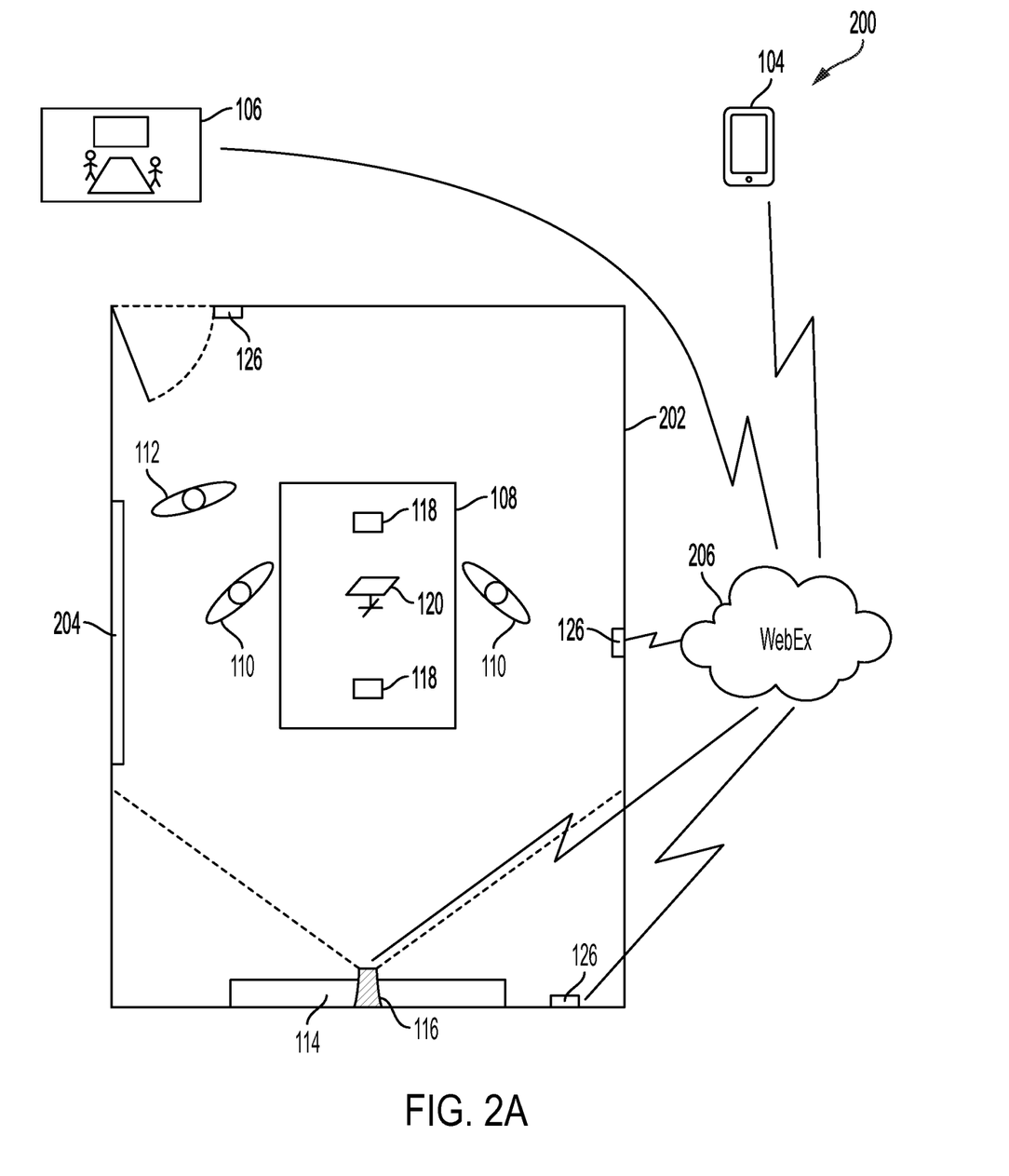
FIGS. 2A-B illustrate multimedia collaboration settings, according to one aspect of the present disclosure.
Figure 2B:
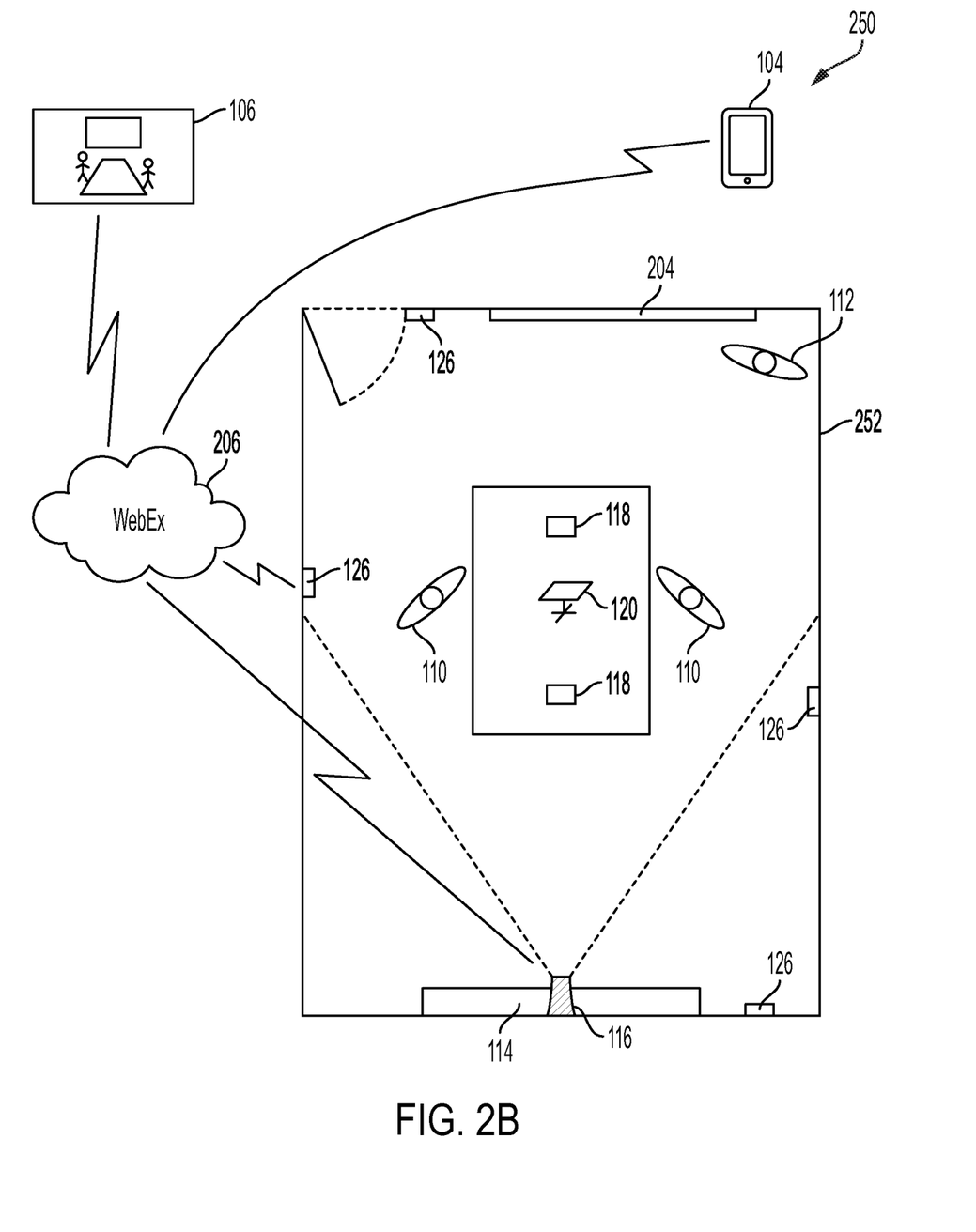

FIGS. 2A-B illustrate multimedia collaboration settings, according to one aspect of the present disclosure. In describing FIGS. 2A-B, components that are the same as those described above with reference to FIG. 1, are numbered the same and thus will be not described further, for sake of brevity.

In setting 200 of FIG. 2A, components 104, 106, 108, 110, 112, 114, 116, 118, 120 and 126 are the same as those described above with reference to FIG. 1 and thus will not be described again.

In setting 200 of FIG. 2A, in addition to display 114, there is an additional digital board 204 installed on a sidewall of conference room 202. Such digital board 204, similar to display 114, may have an adjustable brightness. While in FIGS. 2A-B, a digital board 204 is referenced, digital board 204 may be the same as screen 114, which can simply be a display showing content. For purposes of this disclosure, screen 114, digital board/whiteboard 204 may be used interchangeably and the inventive concepts are equally applicable to both. Furthermore, in setting 200 and in contrast to setting 100 of FIG. 1, main camera 116 may perform the functionalities of camera 122 of FIG. 1 and digital board 204 as well as audience 110, presenter 112, table 108, microphones 118 and control unit 120 fall within FOV of main camera 116.

Furthermore and in contrast to FIG. 1, digital board 204, display 114, camera 116 as well as mobile device 104 and components in conference room are each registered with cloud service (controller) 206. Cloud service 206 may be, for example, WebEx service, developed and commercially available via Cisco Technology, Inc. of San Jose, Calif. With Cisco WebEx service as a non-limiting example, various components may be communicatively coupled via WebEx Lyra service.

In setting 250 of FIG. 2B, components 104, 106, 108, 110, 112, 114, 116, 118, 120, 126, 204 and 206 are the same as those described above with reference to FIG. 2A and thus will not be described again for sake of brevity.

The only difference between setting 200 of FIG. 2A and setting 250 of FIG. 2B is that digital board 204 is installed on the back wall of conference room 252 directly opposite of (and in FOV of) main camera 116, whereas in FIG. 2A, digital board 204 is installed on a side wall of conference room 202.

Furthermore and in contrast to FIG. 1, digital board 204, display 114, camera 116 as well as mobile device 104 and components in conference room are each registered with cloud service 206. Cloud service 206 may be, for example, WebEx service, developed and commercially available via Cisco Technology, Inc. of San Jose, Calif. With Cisco WebEx service as a non-limiting example, various components may be communicatively coupled via WebEx Lyra service.

It should be noted that while FIGS. 1 and 2A-B provide a single display 114/digital board 204 on which content may be displayed and brightness thereof may be adjusted and a single camera 122/116 the exposure of which may be adjusted in conjunction with brightness of the display/digital board, the present disclosure is not limited thereto. In other words, there may be multiple displays and cameras in a conference room whose respective brightness and exposure may be automatically adjusted to optimize display of content for both in person and remote audience.

Figure 3:
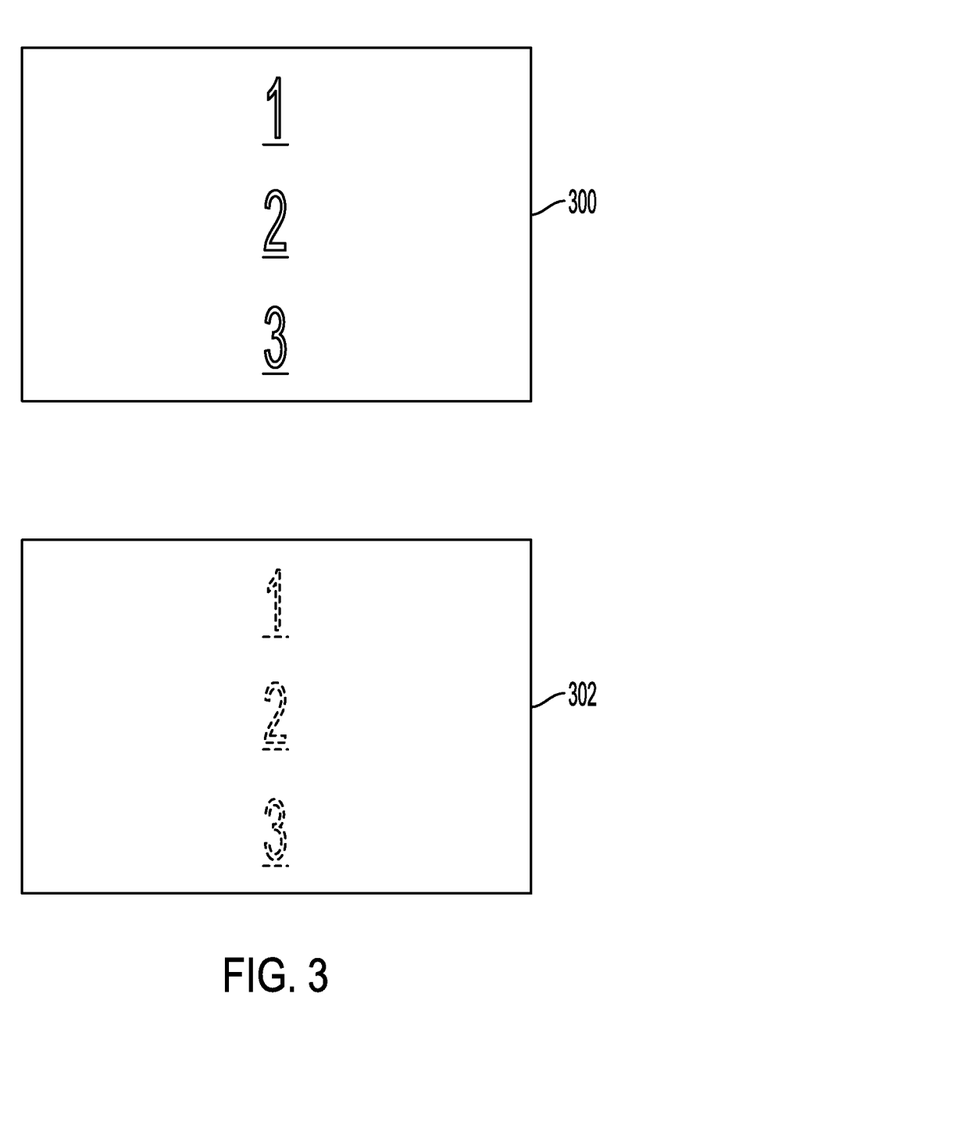
FIG. 3 provides a visual example of content over/under exposure problem.

As briefly mentioned above, use of screens such as display 114 and/or digital board 204 during multimedia collaboration/video conferencing sessions is prevalent. As such digital screens are typically in the field of view of camera(s) that are broadcasting the sessions to remote audience the digital screens may appear very bright and unreadable. Adjusting the brightness of the digital screens for audience who are physically present in the room may result in overexposure (bright and unreadable) of the digital screens for the remote audience through the broadcasting cameras while proper exposure for the remote audience results in underexposure (dark and unreadable) for physically present audience. FIG. 3 provides a visual example of content over/under exposure problem.

FIG. 3 provides two snapshots of display 114 of FIG. 1, which would equally be applicable to digital board 204 of FIGS. 2A-B. Snapshot 300 is display 114 as viewed by audience 110 present in conference room 102 while snapshot 302 is display 114 as viewed by remote audience in conference room 106 and/or via mobile device 104. In this scenario, brightness of display 114 is adjusted to provide the right exposure/visibility of display 114 to audience 110 (e.g., content (1, 2, 3) provided on display 114 is legible and clearly visible to audience 110). At the same time, auto exposure algorithms being implemented by camera 122 (or similarly main camera 116 in FIGS. 2A-B) attempt to ensure that faces of audience 110 and/or presenter 112 are properly captured for display to remote audiences at mobile device 104 and/or in conference room 106. Due to this attempt, content (e.g., 1, 2, 3) on display 114 and/or digital board 204 are completely overexposed (bright and unreadable/blurry). As will be described below with reference to FIG. 4, it is possible to adjust exposure of camera 122 and/or brightness of display 114 or digital whiteboard 204 to improve visibility of content displayed on display 114 or digital whiteboard 204 for the remote audience while maintaining legibility and visibility thereof for audience 110 present in conference room 102.

Figure 4:
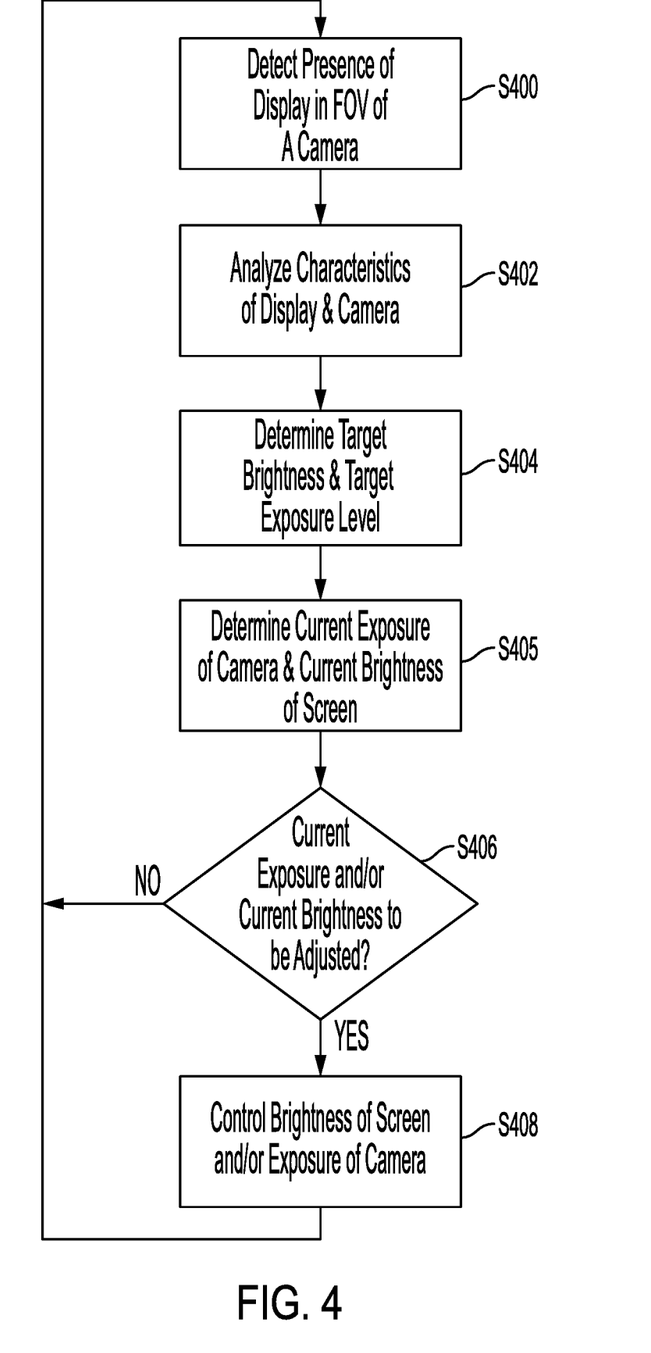
FIG. 4 illustrates a method of automatically adjusting screen brightness of one or more digital screens of the video conferencing session, according to one aspect of the present disclosure.

FIG. 4 illustrates a method of automatically adjusting screen brightness of one or more digital screens of the video conferencing session, according to one aspect of the present disclosure. FIG. 4 will be described from perspective of processing unit 124 and more generally with respect to FIG. 1. However, functionalities of processing unit 124 may be implemented in a similar manner by cloud service 206 described above with reference to FIGS. 2A-B and FIG. 4 is equally applicable to settings 200 and 252 of FIGS. 2A and B.

At S400, processing unit 124 detects presence of display 114 in FOV of camera 122 in conference room 102. Alternatively and with reference to example settings of FIGS. 2A-B, cloud service 206 may detect the presence of digital board 204 in FOV of main camera 116 in conference room 202 or 252.

In one example, locating/detecting display 114 in the conference room 102 may be performed via an installation wizard. For integrated endpoints including microphones and speakers, the 'double active radar' method disclosed in U.S. application Ser. No. 15/729,160 filed on Oct. 10, 2017 can be used, the entire content of which is incorporated herein by reference. Another example detection method may be based on machine learning, where over time location of screens and displays in conference room 102 is learned (e.g., using sensors 126). Another example method, which can be combined with the machine learning method is for display 114 to display known patterns on all available screens inside conference room 102 and use known or to be developed computer vision techniques to detect the location of screens inside conference room 102.

Upon detection of display 114, at S402, processing unit 124 analyzes characteristics of display 114 and camera 122.

These characteristics, at any given instance, are communicated to and thus are known to processing unit 124. More specifically, detected characteristics can include capabilities of the display 114 and camera 122, such as the range of screen brightness level of display 114, lens iris of camera 122, digital gain range of camera 122, etc., are known to processing unit 124.

Based on these characteristics of display 114 and camera 122, processing unit 124, at S404, determines target brightness (e.g., LCD backlight intensity) of display 114 (first target) and target exposure level and appropriate exposure settings for camera 122 (second target).

The above described example targets may be determined based on experiments and/or empirical. For example, for target exposure level of camera 122, artificial intelligence (AI) may be utilized to determine appropriate exposure or pixel average for different models of cameras and different manufactures.

At S405, processing unit 124 analyzes a captured image of conference room 102 to determine a current exposure level of camera 122 and/or a current brightness of display 114, according to any known or to be developed image/video processing methods. For example, determining a current exposure level of camera 122 and/or current brightness of display 114 can be done by examining pixel values (e.g., a room may be exposed such that the average linear pixel value is 18%). By knowing location of display 114 in a captured image, processing unit 124 can examine legibility by evaluating pixel values of the location of display 114 within the captured image.

At S406, processing unit 124 determines if current brightness of display 114 and/or current exposure of camera 122 (determined at S405) is/are to be adjusted based on comparison of the current brightness of display 114 and/or the current exposure of camera 122 to the corresponding one of target brightness and target exposure level. For example, if the a current exposure level of camera 122 is lower or higher than the above described target exposure level, then processing unit 124 may determine to adjust the exposure of camera 122.

The same analysis applies to display 114. For example, if the current brightness is higher or lower than the target brightness described above, processing unit 124 may determine to adjust the brightness of display 114.

In another example, the above described targets may constitute ranges (e.g., range of acceptable iris opening for camera 122, range of acceptable LCD backlight intensity for display 114). While exposure of camera 122 and brightness of display 114 may be within a permissible range, processing unit 124 may still make adjustments to the exposure of camera 122 and/or brightness of display 114 in order to optimize/improve visibility of content on display 114 for both in person/present as well as remote audience and also ensure optimized and legible depiction of conference room 102 (including audience 110) for the remote audience. For example, processing unit 124 may utilize a machine learning based model, where over time and based on various data analysis (based on data collected using sensors 126, for example) as well as user feedback, optimal exposure or camera 122 and brightness of display 114 may be learned and applied.

In another example, any changes to content of display 114, lighting of conference room 102, movement of camera 122 and/or main camera 116 may trigger re-evaluation and adjustment of exposure of camera 122 and/or brightness of display 114.

If at S406, processing unit 124 determines that adjustments to exposure of camera 122 and/or brightness of display 114 are needed, then at S408, processing unit 124 controls exposure of camera 122 and/or brightness of display 114 such that legibility of display 114 for both physically present and remote audience is optimized while at the same time depiction of other elements (e.g., conference room 102 in general and in particular audience 110) are also optimized for the remote audience. Achieving the correct exposure level in camera 122 may be done by modifying analog gain, digital gain, integration time or moving iris of camera 122. Achieving correct brightness of display 114 may be done by reducing or increasing brightness level of display 114.

As a non-limiting example, a simple exposure algorithm may be designed to keep the pixel average for an entire scene of conference room 102 at middle gray intensity (e.g., 18% on linear pixel data). A different non-limiting approach is to look at parts of the scene (e.g. faces of audience) and keep the pixel average of these parts of the scene at middle gray intensity. In another example and for other parts in a scene (e.g., display 114), the algorithms may allow lower pixel averages for display 114 relative to other parts such as faces. A few non-limiting examples are provided below.

As an example, if current exposure level of camera 122 indicates that conference room 102 and its content including audience 110 are correctly exposed but display 114 is not (e.g., too bright), then processing unit 124 may only adjust (e.g., lower) brightness of display 114 in an attempt to improve legibility of display 114 for remote audience.

In another example, if current exposure level of camera 122 indicates that conference room 102 and its content including audience 110 are underexposed but display 114 is correctly exposed, then processing unit 124 may increase exposure of camera 122. However, increasing exposure of camera 122 alone may result in display 114 becoming less legible to remote audience. Therefore, in one example, simultaneous with increasing exposure of camera 122, processing unit 124 may also lower brightness of display 114 to adjust (compensate) for increased exposure of camera 122.

In another example, if current exposure level of camera 122 indicates that conference room 102 and its content including audience 110 are overexposed but display 114 is correctly exposed, then processing unit 124 may reduce exposure of camera 122. Reducing exposure of camera 122 may allow for increasing brightness of display 114.

In another example, if current exposure level of camera 122 indicates that conference room 102 and its content including audience 110 are overexposed and display 114 is not legible (e.g., overexposed or underexposed), then processing unit 124 may reduce exposure of camera 122 (e.g., gradually) and each time evaluate pixel values corresponding to display 114 to determine if display 114 is legible.

As another non-limiting example, if at S406, processing unit 124 determines that a current exposure level of camera 122 is lower than the above described target exposure level, then at S408, processing unit 124 may increase camera 122's exposure level (e.g., increase Iris opening of camera 122 with one step, e.g. from f/2.8-f/2.0), in an attempt to adjust exposure of faces of audience in conference room 102 and improve brightness and legibility of display 114 as well as conference room 102 including audience 110 for remote audience while maintaining a legible display of content on display 114 for audience present in conference room 102. In another example, if at S406, processing unit 124 determines that a current exposure level of camera 122 is more than the target exposure level, then at S408, processing unit 124 may lower camera 122's exposure level to avoid bright and illegible display of content on display 114 to the remote audience.

With respect to display 114, if at S406, processing unit 124 determines that the current brightness of display 114 is less than the target brightness described above, then at S408, processing unit 124 may increase brightness of display 114 (e.g., from 40% to 50%) to improve and adjust legibility of display 114 for both present and remote audience. Similarly, if at S406, processing unit 124 determines that the current brightness of display 114 is more than the target brightness described above, then at S408, processing unit 124 may decrease the brightness of display 114 (e.g., from 60% to 55%) to improve and adjust legibility of display 114 for both present and remote audience. The brightness can be reduced in small steps while an auto exposure algorithm evaluates the result of change in screen brightness. In such case and after each small step, the process reverts back to S402 and processing unit 124 performs S402, S404, S406 and S408 to evaluate and implement the next small step. In another example, processing unit 124 may estimate the required brightness reduction and reduce this in larger steps, with subsequent evaluation using the auto exposure algorithm. An implementation of this could be to control the screen brightness via the auto exposure algorithm in camera 122. Accordingly, adjustments to brightness of display 114 and exposure of camera 122 may constitute a trade-off between the values of two until processing unit 124 determines no further adjustments to exposure level of camera 122 and/or brightness of display 114 is/are needed.

In one example, controlling the brightness of display 114 (and/or board 204) is possible using a proprietary API for integrated displays/systems and HDMI Consumer Electronic Control (CEC) for non-integrated/general displays/systems.

Components of setting 100 (e.g., display 114, main camera 116, camera 122, etc.) form an integrated system where communication standards and extensions are defined by the same provider. For example, setting 100 forms an integrated system when display 114, main camera 116, camera 122 are developed and provided by Cisco Technologies, Inc. of San Jose, Calif. Accordingly, the proprietary API may be XAPI developed by Cisco Technologies, Inc. of San Jose, Calif.

In another example, components of setting 100 (e.g., display 114, main camera 116, camera 122, etc.) form a non-integrated/general system when one or more components such as display 114, main camera 116, camera 122, etc. are provided by different providers (e.g., display 114 is not a Cisco provided display). For such non-integrated displays, controlling the brightness of display 114 may be performed via HDMI CEC with a defined extension supported by manufacturer/provider of such display 114.

Once adjustments are completed, process of FIG. 4 returns to S400 (or optional to S402) and processing unit 124 may periodically or upon detection of a triggering condition, repeat S400, S402, S404, S406 and S408 (or alternatively S402, S404, S406 and S408, if the process reverts back to S402). Such triggering condition can include, but is not limited to, changes to content of display 114, lighting of conference room 102, movement of camera 122 and/or main camera 116, etc.

Referring back to S406, if at S406, processing unit 124 determines that adjustments to exposure of camera 122 and/or brightness of display 114 are not needed, then process of FIG. 4 returns to S400 (or optionally to S402) and processing unit 124 implements S400, S402, S404, S405, S406 and S408 (or alternatively S402, S404, S406 and S408, if the process reverts back to S402), as described above.

With above examples of automatic adjustments to camera exposures and display brightnesses for optimizing visibility of content on display for both present and remote audience, the disclosure now turns to description of example components and system architecture for implement elements in settings 100, 200 and 250 of FIGS. 1 and 2A-B including, but not limited to, processing unit 124, cloud service 206, etc.

Figure 5:
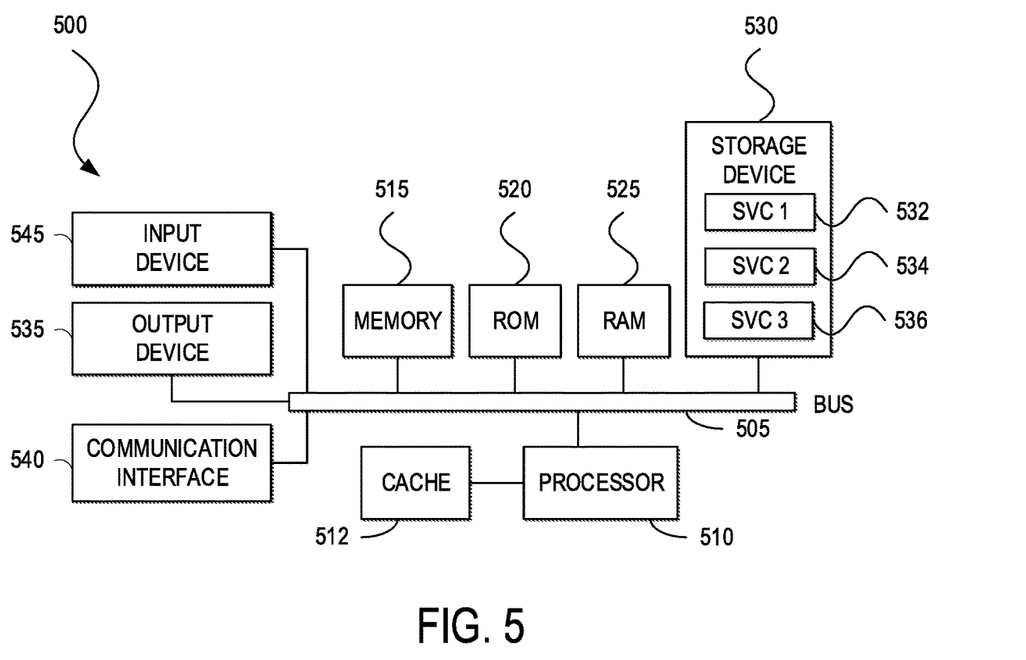
FIG. 5 illustrates example components and system architectures, according to aspects of the present disclosure.

FIG. 5 illustrates example components and system architectures, according to aspects of the present disclosure. FIG. 5 illustrates computing system architecture for use in setting of FIG. 1 and/or FIGS. 2A-B, according to an aspect of the present disclosure. Computing system architecture (device) 500 has components that are in electrical communication with each other using a system connection 505, such as a bus. Exemplary computing device 500 includes a processing unit (CPU or processor) 510 and a system connection 505 that couples various system components including the system memory 515, such as read only memory (ROM) 520 and random access memory (RAM) 525, to the processor 510. The computing device 500 can include a cache of high-speed memory connected directly with, in close proximity to, or integrated as part of the processor 510. The computing device 500 can copy data from the system memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The system memory 515 can include multiple different types of memory with different performance characteristics. The processor 510 can include any general purpose processor and a hardware or software service, such as service (SVC) 1 532, service (SVC) 2 534, and service (SVC) 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, system connection 505, output device 535, and so forth, to carry out the function.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 505, to exchange data and signals and coordinate various types of operations by the network device 500, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information is used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances the present technology may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

We claim:

1. A method comprising:
   determining that a screen is within a field of view (FOV) of a camera;
   determining a first exposure level associated with the screen and a second exposure level associated with a portion of a scene that is within the FOV of the camera, wherein the first exposure level and the second exposure level correspond to a current brightness of the screen and a current exposure of the camera; and
   adjusting at least one of the current exposure of the camera or the current brightness of the screen according to one or more first target exposure levels associated with the screen and one or more second target exposure levels associated with the portion of the scene.

2. The method of claim 1, further comprising:
   determining the current brightness of the screen and the current exposure of the camera;
   comparing the first exposure level with the one or more first target exposure levels and the second exposure level with the one or more second target exposure levels; and
   determining a difference between at least one of (1) the first exposure level and the one or more first target exposure levels or (2) the second exposure level and the one or more second target exposure levels.

3. The method of claim 2, wherein adjusting at least one of the current exposure of the camera or the current brightness of the screen is in response to determining the difference between at least one of the first exposure level and the one or more first target exposure levels or the second exposure level and the one or more second target exposure levels.

4. The method of claim 1, wherein adjusting at least one of the current exposure of the camera or the current brightness of the screen comprises adjusting the current brightness of the screen to a target brightness associated with the one or more first target exposure levels associated with the screen.

5. The method of claim 1, wherein adjusting at least one of the current exposure of the camera or the current brightness of the screen comprises adjusting the current exposure of the camera to a target exposure associated with the one or more second target exposure levels associated with the portion of the scene.

6. The method of claim 1, wherein the one or more first target exposure levels comprises one of a first target exposure threshold or a first target exposure range, and wherein the one or more second target exposure levels comprises one of a second target exposure threshold or a second target exposure range.

7. The method of claim 1, further comprising:
analyzing an image of the scene captured by the camera; and
determining the first exposure level associated with the screen and the second exposure level associated with the portion of the scene based on the image of the scene captured by the camera.

8. A system comprising:
one or more processors; and
at least one non-transitory computer-readable medium having stored thereon instructions which, when executed by the one or more processors, cause the one or more processors to:
determine that a screen is within a field of view (FOV) of a camera;
determine a first exposure level associated with the screen and a second exposure level associated with a portion of a scene that is within the FOV of the camera, wherein the first exposure level and the second exposure level correspond to a current brightness of the screen and a current exposure of the camera; and
control adjust at least one of the current exposure of the camera or the current brightness of the screen according to one or more first target exposure levels associated with the screen and one or more second target exposure levels associated with the portion of the scene.

9. The system of claim 8, wherein the screen is a digital whiteboard, and wherein the system further comprises the camera.

10. The system of claim 8, the at least one non-transitory computer-readable medium having stored thereon instructions which, when executed by the one or more processors, cause the one or more processors to:
determine the current brightness of the screen and the current exposure of the camera;
compare first exposure level with the one or more first target exposure levels and the second exposure level with the one or more second target exposure levels; and
determine a difference between at least one of (1) the first exposure level and the one or more first target exposure levels or (2) the second exposure level and the one or more second target exposure levels.

11. The system of claim 10, wherein adjusting at least one of the current exposure of the camera or the current brightness of the screen is in response to determining the difference between at least one of the first exposure level and the one or more first target exposure levels or the second exposure level and the one or more second target exposure levels.

12. The system of claim 8, wherein adjusting at least one of the current exposure of the camera or the current brightness of the screen comprises adjusting the current brightness of the screen to a target brightness associated with the one or more first target exposure levels associated with the screen.

13. The system of claim 8, the at least one non-transitory computer-readable medium having stored thereon instructions which, when executed by the one or more processors, cause the one or more processors to:
continuously monitoring monitor the scene to detect changes in settings; and
in response to a detected change, adjust at least one of the current exposure of the camera or the current brightness of the screen.

14. The system of claim 8, the at least one non-transitory computer-readable medium having stored thereon instructions which, when executed by the one or more processors, cause the one or more processors to:
analyze an image of the scene captured by the camera; and
determine the first exposure level associated with the screen and the second exposure level associated with the portion of the scene based on the image of the scene captured by the camera.

15. One or more non-transitory computer-readable media comprising computer-readable instructions, which when executed by one or more processors, cause the one or more processors to:
detect that a screen is within a field of view (FOV) of a camera in;
determine a first exposure level associated with the screen and a second exposure level associated with a portion of a scene that is within the FOV of the camera, wherein the first exposure level and the second exposure level correspond to a current brightness of the screen and a current; and
adjust at least one of the current exposure of the camera or the current brightness of the screen according to one or more first target exposure levels associated with the screen and one or more second target exposure levels associated with the portion of the scene.

16. The one or more non-transitory computer-readable media of claim 15, wherein the execution of the computer-readable instructions cause the one or more processors to:
determine the current brightness of the screen and the current exposure of the camera;
compare the first exposure level with the one or more first target exposure levels and the second exposure level with the one or more second target exposure levels; and
determine a difference between at least one of (1) the first exposure level and the one or more first target exposure levels or (2) the second exposure level and the one or more second target exposure levels.

17. The one or more non-transitory computer-readable media of claim 16, wherein adjusting at least one of the current exposure of the camera or the current brightness of the screen is in response to determining the difference between at least one of the first exposure level and the one or more first target exposure levels or the second exposure level and the one or more second target exposure levels.

18. The one or more non-transitory computer-readable media of claim 15, wherein adjusting at least one of the current exposure of the camera or the current brightness of the screen comprises adjusting the current brightness of the screen to a target brightness associated with the one or more first target exposure levels associated with the screen.

19. The one or more non-transitory computer-readable media of claim 15, wherein the execution of the computer-readable instructions cause the one or more processors to:
analyze an image of the scene captured by the camera; and
determine the first exposure level associated with the screen and the second exposure level associated with the portion of the scene based on the image of the scene captured by the camera.

20. The one or more non-transitory computer-readable media of claim 15, wherein the one or more first target exposure levels comprises one of a first target exposure threshold or a first target exposure range, and wherein the one or more second target exposure levels comprises one of a second target exposure threshold or a second target exposure range.

\* \* \* \* \*